(12) United States Patent
Imamura et al.

(10) Patent No.: US 8,983,755 B2
(45) Date of Patent: Mar. 17, 2015

(54) CONTROL SYSTEM AND CONTROL METHOD OF GAS ENGINE

(75) Inventors: Tsukasa Imamura, Kobe (JP); Tomohiko Sugimoto, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 316 days.

(21) Appl. No.: 13/519,017

(22) PCT Filed: Dec. 22, 2010

(86) PCT No.: PCT/JP2010/007422
§ 371 (c)(1),
(2), (4) Date: Aug. 1, 2012

(87) PCT Pub. No.: WO2011/077715
PCT Pub. Date: Jun. 30, 2011

(65) Prior Publication Data
US 2012/0310510 A1 Dec. 6, 2012

(30) Foreign Application Priority Data

Dec. 24, 2009 (JP) ................................. 2009-293069

(51) Int. Cl.
*F02D 41/00* (2006.01)
*F02M 3/00* (2006.01)
(Continued)

(52) U.S. Cl.
CPC ........ *F02D 41/1497* (2013.01); *F02D 41/0027* (2013.01); *F02D 41/083* (2013.01);
(Continued)

(58) Field of Classification Search
CPC ............ F02D 41/2467; F02D 41/0027; F02D 41/004; F02D 41/30; F02D 2009/0203; F02D 2200/0604

USPC .......... 701/104, 103, 112, 110; 123/396, 397, 123/398, 399, 395, 304, 27 GE, 527, 529, 123/436, 492, 1 A, 431, 198 A, 515
See application file for complete search history.

(56) References Cited

U.S. PATENT DOCUMENTS 5,533,492 A * 7/1996 Willey et al. .................. 123/681
5,753,805 A * 5/1998 Maloney ..................... 73/114.32
(Continued)

FOREIGN PATENT DOCUMENTS

JP     A-2001-329913     11/2001
JP     A-2002-188519     7/2002
(Continued)

OTHER PUBLICATIONS

International Search Report issued in International Patent Application No. PCT/JP2010/007422 dated Jan. 25, 2011.

*Primary Examiner* — Lindsay Low
*Assistant Examiner* — George Jin
(74) *Attorney, Agent, or Firm* — Oliff PLC

(57) ABSTRACT

A control system for controlling a power output of a gas engine of the present invention includes a target value setting section for setting as a target value a restricted power output which is less than a predetermined power output when a source gas pressure of a gas fuel is less than a predetermined value required to inject the gas fuel against an intake-air pressure according to the predetermined power output, a power output setting section for setting a set value of a power output based on the target value set by the target value setting section, and a power output control section for controlling the power output so that the power output reaches the set value set by the power output setting section.

5 Claims, 5 Drawing Sheets

(51) Int. Cl.
*F02M 43/00* (2006.01)
*F02D 41/14* (2006.01)
*F02D 19/02* (2006.01)
*F02D 41/08* (2006.01)
*F02M 21/02* (2006.01)

(52) U.S. Cl.
CPC . *F02D2041/1409* (2013.01); *F02D 2200/0406* (2013.01); *F02D 2200/0602* (2013.01); *F02M 21/0275* (2013.01); *F02M 21/0284* (2013.01); *F02D 19/022* (2013.01); *F02D 19/024* (2013.01); *F02D 19/027* (2013.01); *F02M 21/0278* (2013.01); *Y02T 10/32* (2013.01)
USPC . 701/104; 701/103; 123/339.15; 123/339.14; 123/304; 123/399; 123/527

(56) References Cited

U.S. PATENT DOCUMENTS

| | | | |
|---|---|---|---|
| 6,240,910 B1* | 6/2001 | Maekawa et al. | 123/529 |
| 6,687,597 B2* | 2/2004 | Sulatisky et al. | 701/104 |
| 7,367,312 B1* | 5/2008 | Boyer et al. | 123/304 |
| 7,463,967 B2* | 12/2008 | Ancimer et al. | 701/104 |
| 7,546,834 B1* | 6/2009 | Ulrey et al. | 123/525 |
| 7,621,260 B2* | 11/2009 | Mitani et al. | 123/527 |
| 8,710,971 B2* | 4/2014 | Park | 340/451 |
| 2002/0062823 A1* | 5/2002 | Ricco | 123/527 |
| 2008/0022965 A1* | 1/2008 | Bysveen et al. | 123/294 |
| 2008/0099002 A1* | 5/2008 | Boyer et al. | 123/679 |
| 2008/0103676 A1* | 5/2008 | Ancimer et al. | 701/103 |
| 2008/0125955 A1* | 5/2008 | Boyer et al. | 701/104 |
| 2008/0127950 A1* | 6/2008 | Malm | 123/527 |
| 2008/0135005 A1* | 6/2008 | Kotwicki et al. | 123/1 A |
| 2008/0173280 A1* | 7/2008 | Hou | 123/457 |
| 2009/0055077 A1* | 2/2009 | Schule | 701/103 |
| 2010/0012090 A1* | 1/2010 | Lewis, Iii | 123/445 |

FOREIGN PATENT DOCUMENTS

| | | |
|---|---|---|
| JP | A-2002-317664 | 10/2002 |
| JP | A-2003-227371 | 8/2003 |
| JP | A-2004-79451 | 3/2004 |
| JP | A-2006-63831 | 3/2006 |

* cited by examiner

CONTROL SYSTEM AND CONTROL METHOD OF GAS ENGINE

TECHNICAL FIELD

The present invention relates to a control system and a control method of a gas engine which uses a gas fuel as a main fuel.

BACKGROUND ART

In recent years, power generation systems which actuate generators using gas engines to generate electric power have been incorporated into facilities such as industrial plants. A power output of the gas engine is adjusted based on an intake-air pressure and a fuel amount, and the intake-air pressure is set higher and the fuel amount is set greater as a requested load is higher.

In general, the gas engine is supplied with a gas fuel from a fuel supply source provided by gas utilities, etc. The gas fuel supplied from the fuel supply source flows into the engine and is supplied to fuel feed valves provided to correspond to cylinders, respectively. The gas fuel is injected from each of the fuel feed valves to an inside of the cylinder or an intake port and is mixed with intake-air.

As described above, the gas fuel is injected against the intake-air. Therefore, the gas fuel cannot be injected properly, unless a pressure (hereinafter referred to as "gas engine inlet pressure") of the gas fuel, which has flowed into the engine and is in a state which is immediately before being supplied to the fuel feed valve, is not higher than an intake-air pressure. If the gas engine inlet pressure is much higher than the intake-air pressure, a misfire occurs easily. Therefore, a differential pressure between the intake-air pressure and the gas engine inlet pressure is controlled to fall within a predetermined range (see Patent Literature 1).

CITATION LISTS

Patent Literature

Patent Literature 1: Japanese Laid-Open Patent Application Publication No. 2002-317664

SUMMARY OF THE INVENTION

Technical Problem

A source gas pressure of the gas fuel might fluctuate irrespective of an operating (running) state of the gas engine. When the source gas pressure decreases significantly, the gas engine fuel inlet pressure which allows the gas fuel to be injected against the intake-air pressure cannot be ensured. This might result in a situation in which the gas engine cannot continue to operate.

In a conventional method, as an approach to such an emergency, it may be considered that the operation of the gas engine may be stopped when the source gas pressure is less than a predetermined threshold. In this method, the threshold may be set to a value which is equal to or greater than a minimum value of a source gas pressure ensuring a gas engine inlet pressure for allowing the gas fuel to be injected against the intake-air pressure, and the intake-air pressure may be set to correspond to, for example, a full load. That is, in this method, the gas engine is stopped when the source gas pressure decreases significantly to a pressure at which it is difficult to continue the operation at the full load.

However, it is difficult to incorporate the gas engine using the above method into facilities which cannot stop its operation easily, like chemical plants which carry out continuous processing, in terms of operation side. Actually, to incorporate the gas engine into such facilities, it is necessary to separately install a compressor exclusive for increasing the pressure of the gas fuel. This increases facility cost of a power generation system.

Under the circumstances, an object of the present invention is to continue the operation of the gas engine without installing a device for increasing the pressure of the gas fuel, when the source gas pressure of the gas fuel decreases.

Solution to Problem

The present invention has been made under the circumstances, and a control system of a gas engine for controlling a power output of the gas engine which uses a gas fuel as a main fuel, of the present invention, comprises a target value setting section for setting a restricted power output which is less than a predetermined power output, as a target value, when a source gas pressure of the gas fuel is less than a predetermined pressure value determined according to the predetermined power output; a power output setting section for setting a set value of the power output based on the target value set by the target value setting section and a requested value of the power output; and a power output control section for controlling the power output such that the power output reaches the set value set by the power output setting section.

In accordance with the above configuration, when the source gas pressure decreases to a value less than the predetermined pressure value and it becomes difficult to operate the gas engine while maintaining the predetermined power output, the target value of the power output is set to the restricted power output which is less than the predetermined power output, and the power output is controlled to reach the set value set based on the target value. When the power output is restricted in this way, the intake-air pressure decreases. Because of this, even when the source gas pressure becomes less than the predetermined pressure value, it is possible to ensure a state in which the gas fuel can be injected against the intake-air pressure decreased according to the restricted power output. The control system which performs such a control allows the gas engine to continue its operation without installing a device exclusively for increasing the pressure of the gas fuel, when the source gas pressure decreases.

The predetermined power output may be a power output corresponding to a requested load. In accordance with this, even when the source gas pressure becomes a pressure value at which it is difficult to operate the gas engine at the requested load, the gas engine can continue its operation.

The target value setting section may include a primary setting section for setting a primary target value of the power output of the gas engine according to the detected value of the source gas pressure of the gas fuel; and a secondary setting section which compares a change rate of the primary target value set by the primary setting section to an allowable change rate, and sets as the target value a secondary target value determined to change the target value according to the allowable change rate, when the change rate is greater than the allowable change rate. In accordance with this, the power output can be changed smoothly and gradually even when the target value changes rapidly.

The secondary setting section may compare the change rate of the primary target value to a first allowable change rate, when the primary target value increases; and the secondary setting section may compare the change rate of the primary target value to a second allowable change rate greater than the first allowable change rate, when the primary target value decreases. In accordance with this, even when the source gas pressure decreases, the power output can be decreased relatively quickly, and the decrease in the source gas pressure can be addressed suitably. Even when the source gas pressure increases, the power output can be restored gradually, and thus a hunting phenomenon can be suppressed suitably.

The power output setting section may compare the requested value of the power output to the target value set by the target value setting section; the power output setting section may set the set value according to the target value when the target value is less than the requested value; and the power output setting section may set the set value according to the requested value, when the target value is greater than the requested value. In accordance with this, when the requested load is, for example, a rated power output, and the target value is set to a value of a power output less than the rated power output, the power output can be decreased to address the pressure decrease in the gas fuel. By comparison, for example, when the requested load is a partial load, and the pressure of the gas fuel is greater than the predetermined pressure value, the power output of the gas engine can be controlled according to the requested load.

A method of controlling a power output of a gas engine which uses a gas fuel as a main fuel, of the present invention, comprises the steps of: detecting a source gas pressure of the gas fuel; setting as a target value, a restricted power output which is less than a predetermined power output when the detected value of the source gas pressure detected in the step of detecting the source gas pressure of the gas fuel is less than a predetermined value determined according to the predetermined output; setting a set value of the power output based on the target value set in the step of setting the target value and a requested value of the power output; and controlling the power output such that the power output reaches the set value set in the step of setting the power output.

In accordance with this method, like the above stated control system of the gas engine of the present invention, the gas engine can continue its operation without installing a device exclusively for increasing the pressure of the gas fuel, when the source gas pressure decreases.

The above and further objects, features and advantages of the invention will more fully be apparent from the following detailed description of preferred embodiment with accompanying drawings.

Advantageous Effects of the Invention

In accordance with the present invention as described above, the gas engine can continue its operation without installing a device exclusively for increasing the pressure of the gas fuel, when a source gas pressure of the gas fuel decreases.

DESCRIPTION OF EMBODIMENTS

Figure 1:
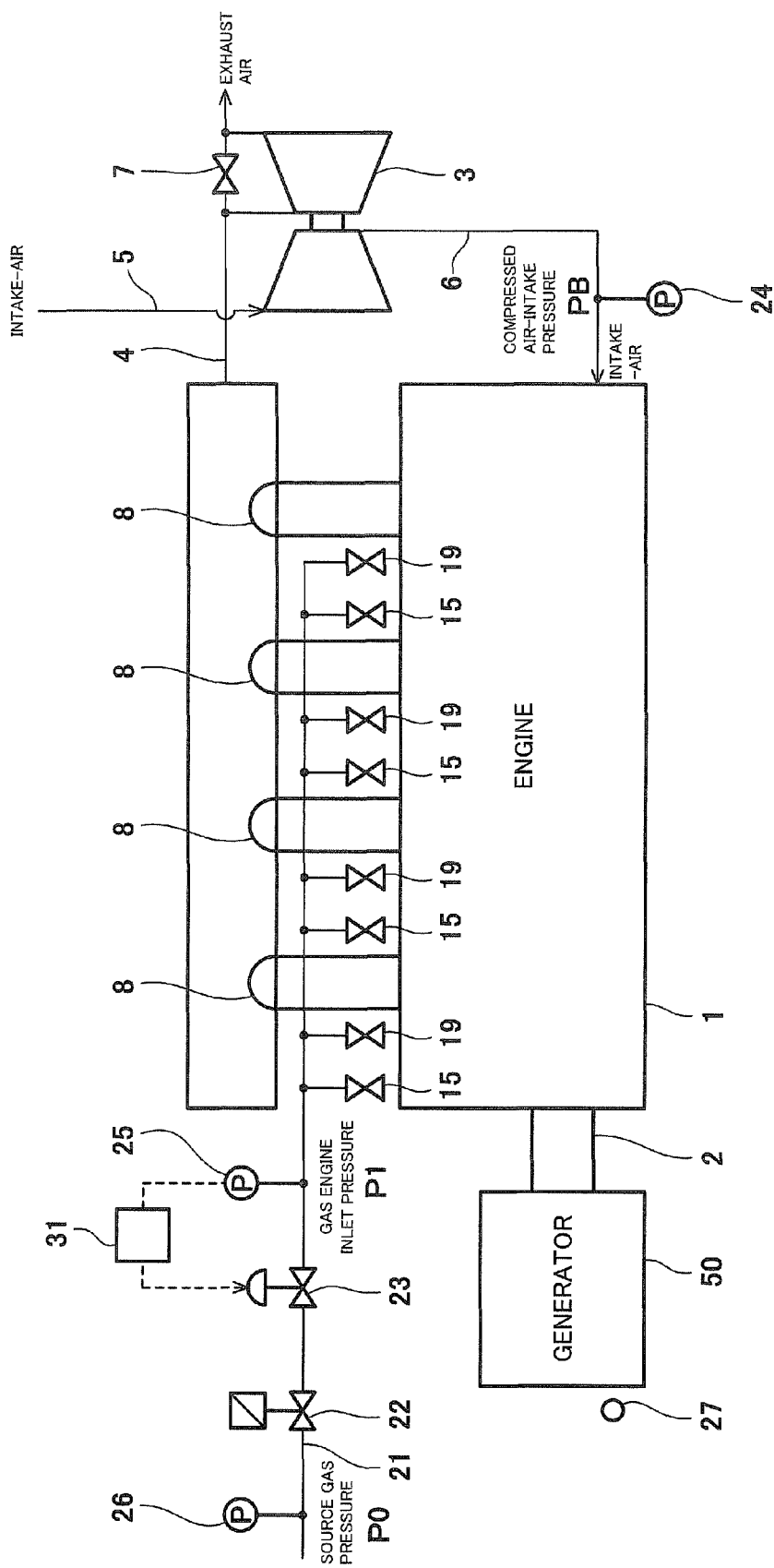
FIG. 1 is a schematic view showing a configuration of a gas engine according to an embodiment of the present invention.

Hereinafter, an embodiment of the present invention will be described with reference to drawings. As shown in FIG. 1, a gas engine 1 is a reciprocating multi-cylinder four-cycle engine which uses a gas fuel as a main fuel. An output shaft 2 of the gas engine 1 is coupled to a generator 50. The generator 50 is driven by the gas engine 1 and generates electric power according to a power output generated in the gas engine 1. The power output of the generator 50 is a load of the gas engine 1. The gas engine 1 for generating electric power may be interactively connected to a commercial utility or may be operated separately from the commercial utility. In the present embodiment, the gas engine 1 may be interactively connected to the commercial utility.

The gas engine 1 is provided with a turbocharger 3. The turbocharger 3 is supplied with air exhausted from the gas engine 1 via an exhaust passage 4. Intake-air from outside is supplied to the turbocharger 3 via an intake-air passage 5. The turbocharger 3 is driven by the exhaust air to compress the intake-air. The compressed intake-air is supplied from the turbocharger 3 to the gas engine 1 via an intake-air passage 6.

Figure 2:
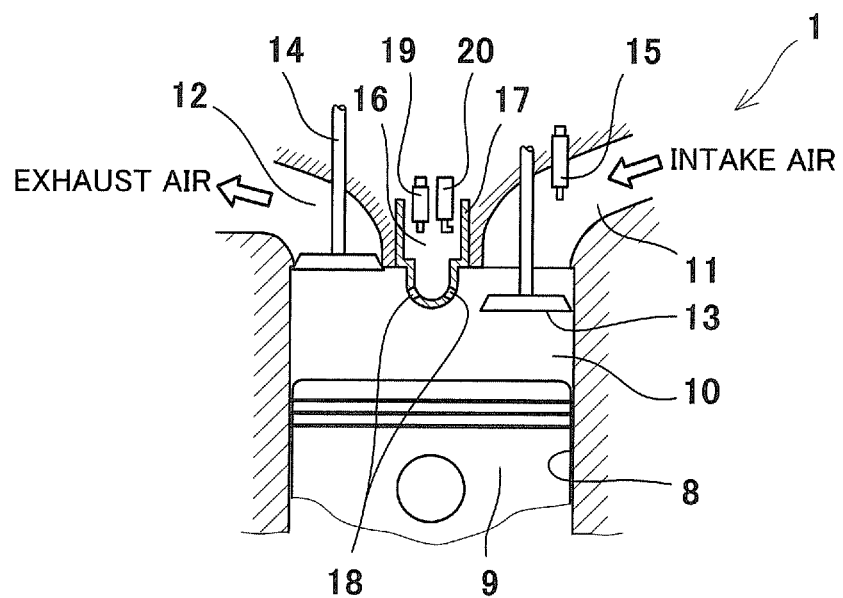
FIG. 2 is a partial cross-sectional view of the gas engine of FIG. 1.

FIG. 2 is a partial cross-sectional view of the gas engine 1. FIG. 2 shows a single cylinder of a plurality of cylinders, but other cylinders have the same structure. A piston 9 is reciprocatably inserted into the cylinder 8. A main combustion chamber 10 is formed above the piston 9. The main combustion chamber 10 connects with an intake port 11 and an exhaust port 12. The intake port 11 is opened and closed by intake valve(s) 13, while the exhaust port 12 is opened and closed by exhaust valve(s) 14. The upstream portion of the intake port 11 is coupled to the above stated intake-air passage 6 (see FIG. 1), while the downstream portion of the exhaust port 12 is coupled to the exhaust passage 4 (see FIG. 1). A main fuel feed valve 15 for injecting a gas fuel is provided in the intake port 11. A sub-combustion chamber 16 is adjacent to the main combustion chamber 10. The sub-combustion chamber 16 is separated from the main combustion chamber 10 by a separating wall 17, and connects with the main combustion chamber 10 through at least one connection hole 18 formed in the separating wall 17. In the sub-combustion chamber 16, a sub-fuel-feed valve 19 for injecting the gas fuel and an ignition plug 20 for combusting an air-fuel mixture are provided.

In accordance with the gas engine 1, an air-fuel mixture containing the air supplied from the turbocharger 3 (FIG. 1) and the gas fuel injected by the main fuel feed valve 15 is supplied to the main combustion chamber 10, through the intake port 11, while a air-fuel mixture containing the gas fuel injected by the sub-fuel-feed valve 19 and added to the air-fuel mixture supplied to the main combustion chamber 10 is supplied to the sub-combustion chamber 16 (intake stroke). The air-fuel mixture is compressed in the main combustion chamber 10 and in the sub-combustion chamber 16 (compression stroke), and then the ignition plug 20 operates at a proper timing to ignite the air-fuel mixture in the sub-combustion chamber 16. A flame generated in the sub-combustion chamber 16 propagates to an interior of the main combustion chamber 10 through the connection hole 18. The flame causes the compressed air-fuel mixture to be combusted in the interior of the main combustion chamber 10. Thereby, the piston 9 moves downward (expansion stroke). Then, gas is exhausted from the main combustion chamber 10 to the exhaust port 12 (exhaust stroke).

Turning to FIG. 1, when an intake-air pressure PB rises and the fuel fed to the cylinder 8 increases in amount, a power output of the gas engine 1 increases. With the increase in the power output of the gas engine 1, the rotational speed of the turbocharger 3 increases, and an intake-air amount and the intake-air pressure PB increase. An exhaust bypass valve 7 is provided in the exhaust passage 4 to adjust the amount of exhaust air supplied to the turbocharger 3. By adjusting the opening degree of the exhaust bypass valve 7, the intake-air pressure PB can be adjusted precisely.

The main fuel feed valve 15 and the sub-fuel-feed valve 19 provided for each cylinder 8 are coupled in parallel to the downstream end portion of a fuel passage 21. The upstream end portion of the fuel passage 21 is coupled to an outside fuel supply source (not shown) provided by, for example, a gas utility. The gas fuel from the fuel supply source is supplied to the main fuel feed valve 15 and the sub-fuel-feed valve 19 via the fuel passage 21.

A gas cut-off valve 22 and a gas pressure adjustment valve 23 are provided on the fuel passage 21 in this order from upstream side. The gas cut-off valve 22 opens the fuel passage 21 in a normal state, and closes the fuel passage 21 when the gas engine 1 is stopped in an emergency case. The gas pressure adjustment valve 23 opens and closes the fuel passage 21 such that its opening degree is variable, thereby adjusting a gas engine inlet pressure P1. The "gas engine inlet pressure P1" is defined as a pressure of the gas fuel which has flowed into the engine and is in a state immediately before being divided to be fed to the fuel feed valves 15 and 19. The gas engine inlet pressure P1 cannot be set to a value greater than a source gas pressure P0 because of a pressure loss in the fuel passage 21 and the pressure adjustment valve 23 except for a case where a device for pressure increase is installed. The source gas pressure P0 is defined as a pressure of the gas fuel in the fuel supply source, to be broad, a pressure of the gas fuel in a region upstream of the pressure adjustment valve 23, and might fluctuate irrespective of the operating state of the gas engine 1.

The main fuel feed valve 15 and the sub-fuel-feed valve 19 are constituted by electromagnetic on-off valves, respectively. By adjusting the gas engine inlet pressure P1, the open period of the main fuel feed valve 15, and the open period of the sub-fuel-feed valve 19, the amount of the fuel injected from the main fuel feed valve 15 and the amount of the fuel injected from the sub-fuel-feed valve 19 can be controlled.

The opening degree of the gas pressure adjustment valve 23 is changed such that the gas engine inlet pressure P1 is higher by a first predetermined pressure $\Delta P_1$ than the intake-air pressure PB (P1=PB+$\Delta P_1$). This allows the fuel feed valves 15 and 19 to sufficiently inject the gas fuel to inside of the intake port 11 through which the intake-air from the turbocharger 3 flows, against the intake-air pressure PB.

In the gas engine 1 of the present embodiment, when the source gas pressure P0 of the gas engine 1 decreases, the power output of the gas engine 1 is controlled so that the main fuel feed valve 15 and the sub-fuel-feed valve 19 can inject the gas fuel against the intake-air pressure PB, to enable the gas engine 1 to continue its operation. As described above, the power output of the generator 50 is determined by the power output of the gas engine 1. Therefore, by controlling the power output of the generator 50, the power output of the gas engine 1 can be controlled, and vice versa. In the present embodiment, through control of the power output of the generator 50, the power output of the gas engine 1 is controlled. In addition, through control for changing a fuel amount, i.e., control for changing the open period(s) of the main fuel feed valve 15 and/or the sub-fuel-feed valve 19, the control for changing the power output KW of the generator 50 based on the source gas pressure P0 is executed.

To enable the above control, the gas engine 1 includes an intake-air pressure sensor 24 for detecting the intake-air pressure PB, an inlet pressure sensor 25 for detecting the gas engine inlet pressure P1, a source gas pressure sensor 26 for detecting the source gas pressure P0, and a power output sensor 27 for detecting the power output of the generator 50 (i.e., load of the gas engine 1).

Figure 3:
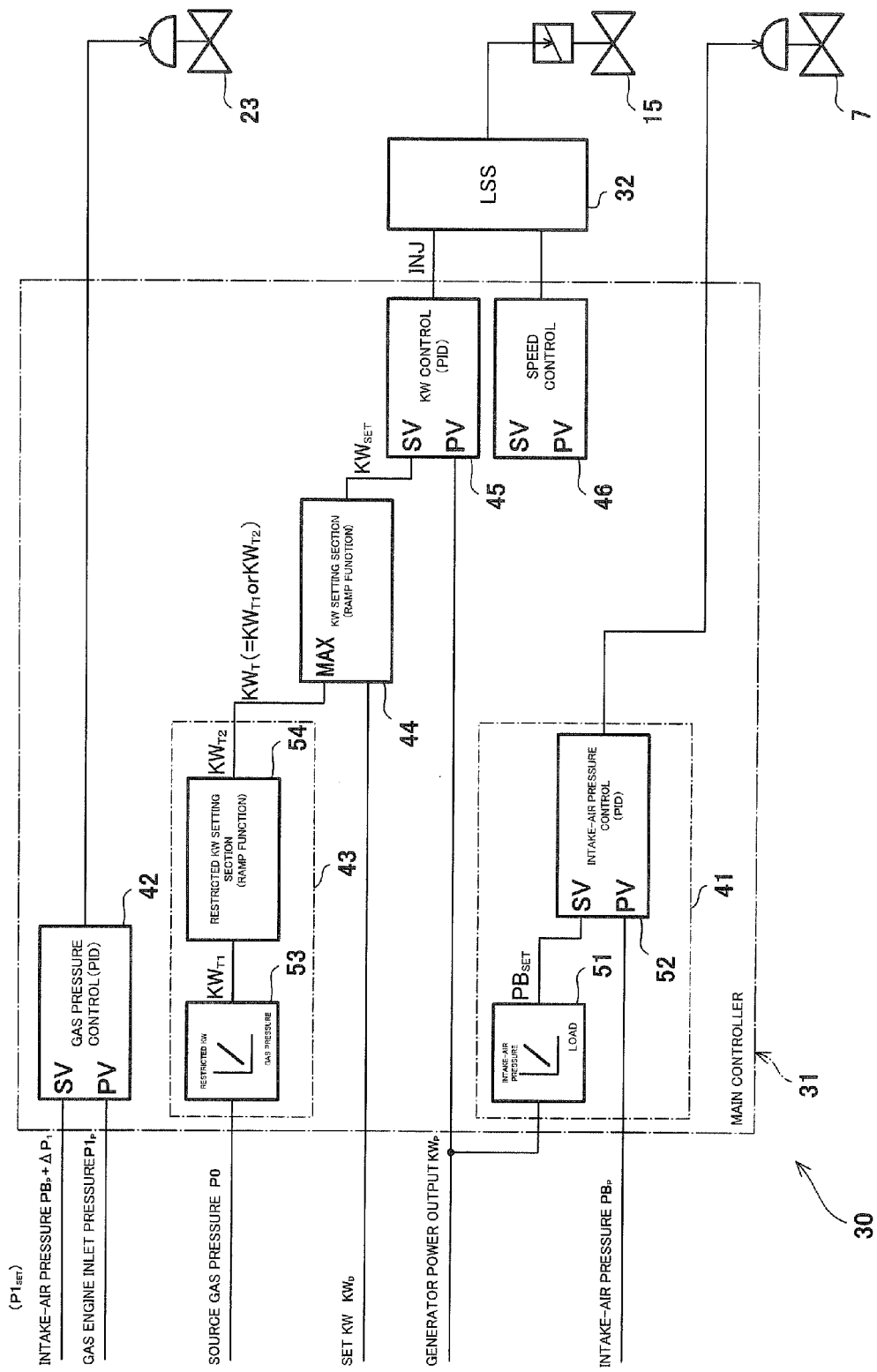
FIG. 3 is a block line diagram showing a configuration of a control system of the gas engine of FIG. 1.

FIG. 3 is a block line diagram showing a control system of the gas engine 1 of FIG. 1. The gas engine 1 includes a control system 30 including a main controller 31 and a fuel controller 32. The main controller 31 includes an intake-air pressure control section 41, a gas pressure control section 42, a target value setting section 43, a power output setting section 44, and a power output control section 45. The main controller 31 further includes a speed control section 46 for controlling a rotational speed of the output shaft 2 into a rotational speed corresponding to a power frequency of the utility with which the gas engine 1 is interactively connected, and a synchronization/connection device (not shown) for synchronizing a phase of the generator 50 with a phase of the utility and interactively connecting the generator 50 to the utility.

The intake-air pressure setting section 41 includes a set value setting section 51 and an intake-air pressure control section 52. The set value setting section 51 sets a set value $PB_{SET}$ of the intake-air pressure based on the power output KW detected by the power output sensor 27 (see FIG. 1), with reference to an intake-air pressure control map. The intake-air pressure control section 52 compares a measurement value $PB_P$ of the intake-air pressure detected by the intake-air pressure sensor 24 to the set value $PB_{SET}$ of the intake-air pressure set by the set value setting section 51. The intake-air pressure control section 52 controls the opening degree of the exhaust bypass valve 7 based on a difference between the measurement value $PB_P$ and the set value $PB_{SET}$ so that the intake-air pressure PB reaches the set value $PB_{SET}$.

The gas pressure control section 42 compares a set value $P1_{SET}$ of the gas engine inlet pressure which is derived by adding a first predetermined pressure $\Delta P_1$ to the intake-air pressure $PB_P$ detected by the intake-air pressure sensor 24 (see FIG. 1), to the measurement value $P1_P$ of the gas engine inlet pressure detected by the inlet pressure sensor 25 (see FIG. 1). The gas pressure control section 42 controls the opening degree of the gas pressure adjustment valve 23 based on a difference between the measurement value $P1_P$ and the set value $P1_{SET}$ so that the gas engine inlet pressure P1 reaches the set value $P1_{SET}$.

Figure 4:
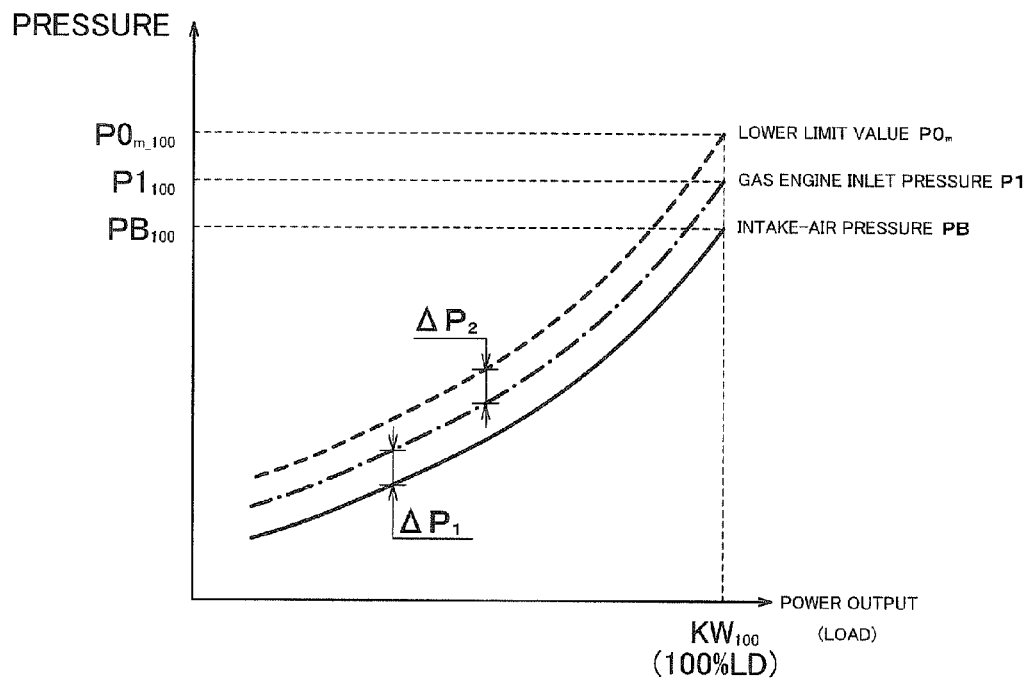
FIG. 4 is a graph showing a map of a set value of a gas engine inlet pressure with respect to an intake-air pressure which is referred to by a gas pressure control section of FIG. 3.

As shown in FIG. 4, the set value $PB_{SET}$ of the intake-air pressure PB is set greater as the power output KW increases. In the present embodiment, there is shown an example in which the set value $PB_{SET}$ changes to form a downward convex shape with respect to the power output KW. The exemplary change is similar to a change in the intake-air pressure with respect to the power output of the gas engine 1. By precisely adjusting the intake-air pressure PB by adjusting the opening degree of the exhaust bypass valve 7, a slight fluctuation in performance of the turbocharger 3 due to a difference in exhaust air temperature or atmospheric temperature can be absorbed, and the intake-air pressure PB can be controlled to reach the set value $PB_{SET}$.

FIG. 4 also shows the gas engine inlet pressure P1 with respect to the power output KW. The gas engine inlet pressure P1 is controlled to reach a value which is higher than the intake-air pressure PB by the first predetermined value $\Delta P_1$, irrespective of a magnitude of the power output KW. That is, the change in the gas engine inlet pressure P1 with respect to the power output KW is parallel to the change in the set value $PB_{SET}$ of the intake-air pressure PB.

FIG. 4 shows a lower limit value $P0_m$ of the source gas pressure P0 which ensures the gas engine inlet pressure P1. The lower limit value $P0_m$ is set to a value which is greater than the gas engine inlet pressure P1 by a second predetermined value $\Delta P_2$ taking into account the above mentioned pressure loss. For example, when an intake-air pressure $PB_{100}$ is determined according to a power output $KW_{100}$ corresponding to a full load (100% LD), it is necessary to set the gas engine inlet pressure P1 with which the fuel is injected against the intake-air pressure $PB_{100}$, to a pressure $P1_{100}$ which is higher than the intake-air pressure $PB_{100}$ by the first predetermined value $\Delta P_1$. To ensure the gas engine inlet pressure $P1_{100}$, it is required that the source gas pressure P0 be equal to or greater than a pressure value ($P0_{m\_100}$) which is higher than the gas engine inlet pressure $P1_{100}$ by the second predetermined value $\Delta P_2$. Conversely, when the source gas pressure P0 is less than the lower limit value $P0_{m\_100}$, the gas fuel cannot be injected against the intake-air pressure $PB_{100}$ corresponding to the power output $KW_{100}$. This might result in a situation in which the operation of the gas engine 1 cannot be continued.

As described above, in the conventional method in a case where the source gas pressure decreases, the gas engine 1 is stopped or the pressure of the gas fuel is increased, when the source gas pressure P0 is less than its lower limit value $P0_{m\_100}$. By comparison, in the method of the present embodiment, as indicated by a broken line in FIG. 4, attention is focused on the fact that, if the source gas pressure P0 is equal to or greater than the pressure value $P0_m$ which is higher than the intake-air pressure PB set according to the load, by a sum of the first predetermined value $\Delta P_1$ and the second predetermined value $\Delta P_2$, the gas fuel can be injected against the intake-air pressure PB, and thereby the engine 1 can continue to operate at this load. In this case, the change in the lower limit value $P0_m$ of the source gas pressure P0 with respect to the load is parallel to the change in the set value $PB_{SET}$ of the intake-air pressure and the change in the gas engine inlet pressure P1.

Turning back to FIG. 3, the target value setting section 43 sets a target value of the power output of the gas engine 1 based on the source gas pressure P0. To be more specific, the target value setting section 43 sets a target value $KW_T$ of the power output KW of the generator 50 based on the power output of the gas engine 1. The power output setting section 44 compares the target value $KW_T$ set by the target value setting section 43 to a requested value $KW_D$ of the power output of the generator 50 and sets the set value $KW_{SET}$ of the power output KW of the generator 50.

The power output control section 45 compares the set value $KW_{SET}$ set by the power output setting section 44 to a measurement value $KW_P$ of the power output KW of the generator 50 which is detected by the power output sensor 27. The power output control section 45 outputs to the fuel control section 32, a command value INJ of the open period of the main fuel feed valve 15 which is required to allow the power output KW of the generator 50 to reach the set value $KW_{SET}$, based on a difference between the set value $KW_{SET}$ and the measurement value $KW_P$. The fuel control section 32 controls the main fuel feed valve 15 in accordance with the command value INJ received from the power control section 45. This allows the power output KW of the generator 50 to be controlled to reach the set value $KW_{SET}$.

Hereinafter, a detailed description will be given of the target value $KW_T$ set by the target value setting section 43 and the set value $KW_{SET}$ set by the power output setting section 44, based on the above mentioned attention.

The target value setting section 43 includes a primary setting section 53 and a secondary setting section 54. The primary setting section 53 sets a primary target value $KW_{T1}$ of the power output KW of the gas engine 1 based on a measurement value of the source gas pressure P0 measured by the source gas pressure sensor 26, with reference to a restricted power output map. The secondary setting section 54 derives a secondary target value $KW_{T2}$ of the gas engine 1 based on the primary target value $KW_{T1}$ set by the primary setting section 53, and sets the derived secondary target value $KW_{T2}$ as the target value $KW_T$.

Figure 5:
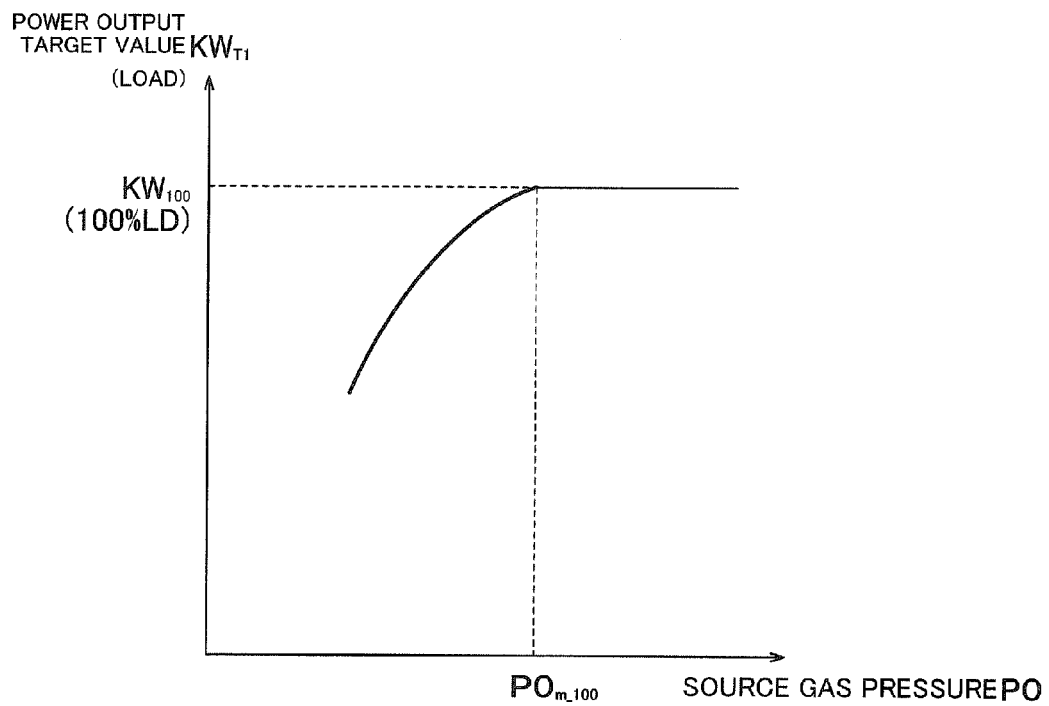
FIG. 5 is a graph showing a map of a target value of a power output with respect to a gas fuel pressure which is referred to by a primary setting section of FIG. 3.

FIG. 5 shows the restricted power output map which is referred to by the primary setting section 53 of FIG. 3. As can be seen from FIG. 5, when the source gas pressure P0 is equal to or greater than the pressure value $P0_{m\_100}$ which ensures continuation of the operation of the gas engine 1 with the power output $KW_{100}$ corresponding to the full load, the primary target value $KW_{T1}$ is set to the power output $KW_{100}$. When the source gas pressure P0 is less than the pressure value $P0_{m\_100}$, a restricted power output which is less than the power output $KW_{100}$ is set as the primary target value $KW_{T1}$. In this case, the primary target value $KW_{T1}$ is set to a smaller value as the source gas pressure P0 is smaller. The primary target value $KW_{T1}$ corresponding to the source gas pressure P0 may be set to change according to the change in the lower limit value $P0_m$ of the source gas pressure P0 as indicated by a broken line of FIG. 4.

To be specific, as shown in FIG. 5, a change in the primary target value $KW_{T1}$ with respect to the source gas pressure P0, corresponds to a relation formed by reversing the change in the lower limit value $P0_m$ of the source gas pressure P0 of FIG. 4, in a vertical axis and a horizontal axis. In the present embodiment, FIG. 4 shows a case where the intake-air pressure PB increases to form a downward convex shape according to an increase in the load. In association with this, FIG. 5 shows a case where the primary target value $KW_{T1}$ decreases to form an upward convex shape according to a decrease in the source gas pressure P0. This is merely exemplary, and the primary target value $KW_{T1}$ may change in a modified manner. Also, in the present embodiment, when the source gas pressure P0 is less than the pressure value $P0_{m\_100}$ which is determined as necessary to inject the gas fuel against the intake-air pressure according to the power output corresponding to the full load, the restricted power output which is less than this power output is set as the primary target value. However, this is merely exemplary and may be changed suitably. To be specific, when the source gas pressure P0 is less than a pressure value determined according to a power output corresponding to a requested load, the primary target value may be set in the same manner. Or, when the source gas pressure P0 is less than a pressure value determined according to another predetermined power output, the primary target value may be set in the same manner. The predetermined power output may have plural values.

Turning back to FIG. 3, the secondary setting section 54 uses a predetermined ramp function. That is, when a change rate of the primary target value $KW_{T1}$ set by the primary setting section 53 is less than a predetermined allowable change rate, the secondary setting section 54 sets the primary target value $KW_{T1}$ as the target value $KW_T$. On the other hand, when the change rate of the primary target value $KW_{T1}$ is equal to or greater than the predetermined allowable change rate, the secondary setting section 54 derives a secondary target value $KW_{T2}$ which changes the target value $KW_T$ according to the allowable change rate and sets the secondary target value $KW_{T2}$ as the target value $KW_T$. The change rate of the primary target value $KW_{T1}$ may be a difference between a primary target value set by the primary setting section 53 in a current process and a primary target value or a secondary target value set in a previous process.

The ramp function may be set such that a first allowable change rate compared when the primary target value $KW_{T1}$ increases is smaller than a second allowable change rate compared when the primary target value $KW_{T1}$ decreases. That is, when the source gas pressure P0 is less than the lower limit value $P0_{m\_100}$ corresponding to the full load and is decreasing, the change rate of the target value $KW_T$ (i.e., secondary target value $KW_{T2}$) may be set to a relatively greater value, although there is a limitation by the second allowable change rate. When the source gas pressure P0 is less than the lower limit value $P0_{m\_100}$ and is increasing, the change rate of the target value $KW_T$ (i.e., secondary target value $KW_{T2}$) may be set to a relatively smaller value according to the change rate of the first allowable change rate.

The power output setting section 44 compares the target value $KW_T$ set by the target value setting section 43 as described above to the requested value $KW_D$ of the power output of the generator 50 determined by the requested load and sets the set value $KW_{SET}$ based on a result of the comparison.

When the target value $KW_T$ is greater than the requested value $KW_D$, the set value $KW_{SET}$ is set based on the requested value $KW_D$. This make it possible to control the power output as desired when the source gas pressure P0 is sufficiently higher than the lower limit value $P0_{m\_100}$ but the requested load is a partial load. When the target value $KW_T$ is less than the requested value $KW_D$, the set value $KW_{SET}$ is set based on the target value $KW_T$. In this way, for example, when the requested load is the full load and the source gas pressure P0 is less than the lower limit value $P0_{m\_100}$, the power output can be decreased to address the decrease in the source gas pressure P0.

The power output setting section 44 also sets a final set value using a predetermined ramp function. Thereby, the power output can be changed smoothly and gradually even if the requested load changes rapidly, in the case where the set value $KW_{SET}$ is set based on the requested value $KW_D$. When the set value $KW_{SET}$ is set based on the target value $KW_T$, this target value $KW_T$ may be set as the set value $KW_{SET}$, because the target value $KW_T$ has been filtered by the ramp function in the secondary setting section 45.

The power output control section 45 and the fuel control section 32 control the power output such that the power output reaches the set value $KW_{SET}$.

Figure 6:
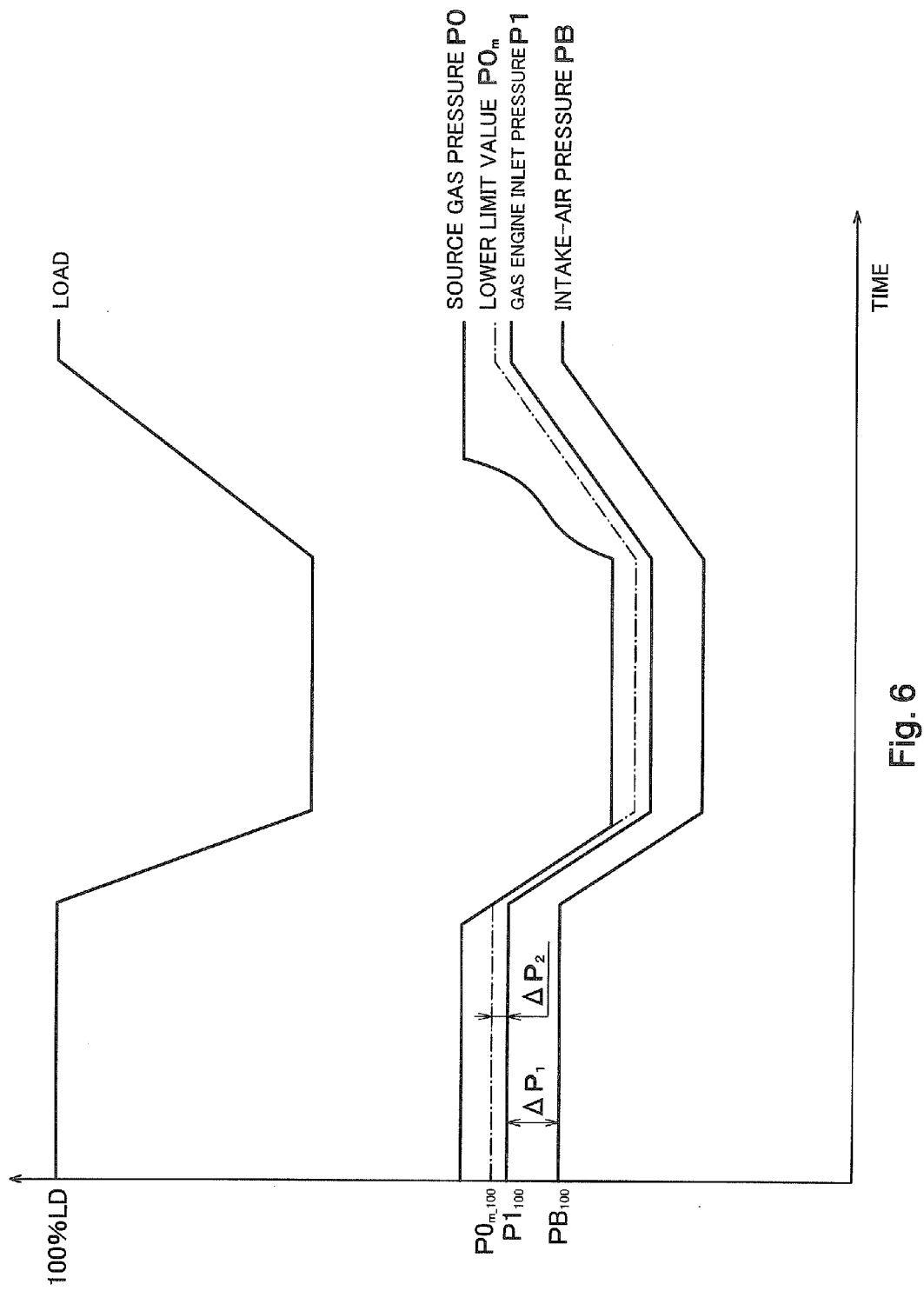
FIG. 6 is a timing chart showing how a power output shifts under control by a control system of FIG. 3 and an example of the power output which shifts when a source gas pressure fluctuates.

With reference to FIG. 6, a description will be given of a behavior of the power output in a case where the source gas pressure P0 decreases. In FIG. 6, a horizontal axis indicates a time, an upper part of a vertical axis indicates a load (power output KW of the generator 50) of the gas engine 1, and a lower part of the vertical axis indicates a pressure. FIG. 6 illustrates a behavior in which when the requested load is set to the full load, the source gas pressure P0 decreases and increases.

When the source gas pressure P0 is equal to or greater than the lower limit value $P0_{m\_100}$ corresponding to the full load, the primary setting section 53 continues to set the primary target value $KW_{T1}$ to a set value corresponding to the full load. Therefore, the power output setting section 44 sets the power output corresponding to the full load as the set value $KW_{SET}$.

When the source gas pressure P0 is less than the lower limit value $P0_{m\_100}$, the primary setting section 53 sets the primary target value $KW_{T1}$ of the power output to the restricted power output which is less than the power output $KW_{100}$ corresponding to the full load. Thereby, the target value $KW_T$ set by the target value setting section 43 is less than the requested value $KW_D$, and the power output setting section 44 sets the target value $KW_T$ as the set value $KW_{SET}$. Since the open period of the main fuel feed valve 15 is changed to be shorter based on the set value $KW_T$, the fuel supply amount decreases and the power output KW decreases. With the decrease in the power output KW, the rotational speed of the turbocharger 3 changes to decreasing in a gradual manner, and the set value $PB_{SET}$ set by the intake-air pressure setting section 41 is changed to decrease in a gradual manner, so that the intake-air pressure PB decreases.

With the decrease in the intake-air pressure PB, the gas engine inlet pressure P1 decreases correspondingly, and the lower limit value $P0_m$ of the source gas pressure P0 decreases correspondingly. Therefore, even when the source gas pressure P0 becomes less than the lower limit value $P0_{m\_100}$ corresponding to the full load, it can be set equal to or greater than the lower limit value $P0_m$ determined according to the load at that point of time. This allows the main fuel feed valve 15 to inject the gas fuel into inside of the intake port 11 against the intake-air pressure PB, thereby making it possible to continue the operation of the gas engine 1. During a period in which the power output KW is decreased because of a decrease in the source gas pressure P0, a load is shared by the utility to which the gas engine 1 is interactively connected.

Thus, a period when the source gas pressure P0 is decreasing, the primary target value $KW_{T1}$ is decreasing. As described above, when the primary target value $KW_{T1}$ is decreasing, the allowable change rate of the target value is set to a relatively greater value. Therefore, the power output KW can be decreased quickly even if the source gas pressure P0 decreases rapidly. Thereby, the intake-air pressure PB and the lower limit value $P0_m$ of the source gas pressure P0 can be decreased quickly in the same manner. Because of this, it is possible to suitably address a rapid decrease in the source gas pressure P0 and continue the operation of the gas engine 1.

When the source gas pressure P0 changes from decreasing to increasing, the primary target value $KW_{T1}$ increases. As described above, when the primary target value $KW_{T1}$ increases, the allowable change rate of the target value $KW_T$ is set to a relatively smaller value. Thereby, the power output KW increases gradually with respect to an increase speed of the source gas pressure P0, and the intake-air pressure PB and the lower limit value $P0_m$ of the source gas pressure P0 can be increased gradually. This makes it possible to ensure a great difference between the source gas pressure P0 and the lower limit value $P0_m$. Therefore, even if the source gas pressure P0 does not increase stably, the gas fuel can be injected against the intake-air pressure PB, and a hunting phenomenon can be suppressed effectively.

Although the embodiment of the present invention has been described, the above configuration may be suitably changed within a scope of the present invention. For example, to decrease the power output of the gas engine 1 when the source gas pressure decreases, the open period of the sub-fuel-feed valve 19 may be controlled to be reduced, as well as reduction of the open period of the main fuel feed valve (reduction of the amount of fuel injected from the main fuel feed valve 15).

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention can continue the operation of a gas engine when a source gas pressure of a gas fuel decreases without installing a device for increasing a pressure of the gas fuel, and is advantageously applicable to a power generation gas engine which is supplied with the gas fuel from an outside fuel supply source.

REFERENCE SINGS LISTS 1 gas engine
15 main fuel feed valve
19 sub-fuel-feed valve
21 fuel passage
22 gas cut-off valve
23 gas pressure adjustment valve
24 intake-air pressure sensor
25 inlet pressure sensor
26 source gas pressure sensor
31 main controller
41 intake-air pressure setting section
42 gas pressure control section
43 target value setting section
44 power output setting section
45 power output control section
53 primary setting section
54 secondary setting section

The invention claimed is:

1. A control system of a gas engine for controlling a power output of the gas engine, which uses a gas fuel as a main fuel, the control system comprising:
   a target value setting section for setting a target value of the power output according to a source gas pressure of gas fuel;
   a power output setting section for setting a set value of the power output based on the target value set by the target value setting section and a requested value of the power output; and
   a power output control section for controlling the power output such that the power output reaches the set value set by the power output setting section, wherein
   the target value setting section includes:
      a primary setting section for setting a primary target value of the power output such that the primary target value decreases as the source gas pressure decreases, when the source gas pressure is less than a predetermined pressure value corresponding to a full load, and
      a secondary setting section for setting a secondary target value of the power output according to an allowable change rate, as the target value to be input to the power output setting section, when a change rate of the primary target value, which is set by the primary setting section, is greater than the allowable change rate,
   the allowable change rate includes a first allowable change rate and a second allowable change rate which is greater than the first allowable change rate, and
   the secondary setting section compares the change rate of the primary target value to the first allowable change rate when the primary target value increases, and compares the change rate of the primary target value to the second allowable change rate when the primary target value decreases.

2. The control system of the gas engine according to claim 1,
   wherein the power output setting section compares the requested value of the power output to the target value set by the target value setting section;
   the power output setting section sets the set value according to the target value when the target value is less than the requested value; and
   the power output setting section sets the set value according to the requested value, when the target value is greater than the requested value.

3. A method of controlling a power output of a gas engine which uses a gas fuel as a main fuel, comprising the steps of:
   detecting a source gas pressure of the gas fuel;
   setting a target value of the power output according to the source gas pressure detected in the step of detecting the source gas pressure;
   setting a set value of the power output based on the target value set in the step of setting the target value and a requested value of the power output; and
   controlling the power output such that the power output reaches the set value set in the step of setting the power output, wherein
   the step of setting the target value includes:
      setting a primary target value of the power output such that the primary target value decreases as the source gas pressure decreases, when the source gas pressure is less than a predetermined pressure value corresponding to a full load, and
      setting a secondary target value of the power output according to an allowable change rate, when a change rate of the primary target value set in the step of setting the primary target value is greater than the allowable change rate,
   the allowable change rate includes a first allowable change rate and a second allowable change rate which is greater than the first allowable chance rate, and
   in the step of setting the secondary target value, the change rate of the primary target value is compared to the first allowable change rate when the primary target value increases, and is compared to the second allowable change rate when the primary target value decreases.

4. The control system of the gas engine according to claim 1,
   wherein a generator is actuated by the power output of the gas engine.

5. The control system of the gas engine according to claim 1,
   wherein the source gas pressure of the gas fuel from a fuel supply source decreases and increases during operation of the gas engine.

* * * * *